Dec. 31, 1968   E. R. PRELLETZ   3,419,119
FRAMING CLUTCH MECHANISM
Filed June 17, 1966
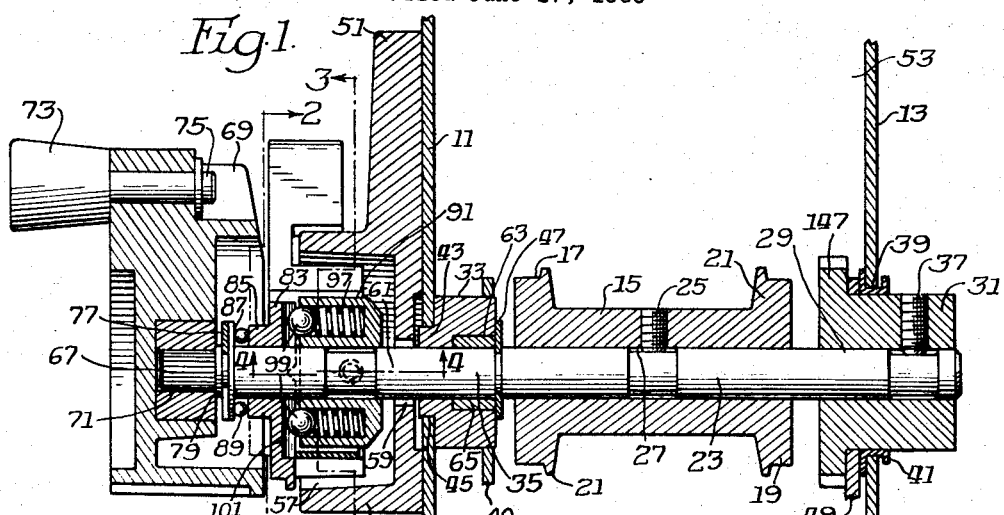
INVENTOR.
Edward R. Prelletz
BY
John E. Peele Jr. Atty.

United States Patent Office 3,419,119
Patented Dec. 31, 1968

3,419,119
FRAMING CLUTCH MECHANISM
Edward R. Prelletz, Chicago, Ill., assignor to Bell & Howell Company, Chicago, Ill., a corporation of Illinois
Filed June 17, 1966, Ser. No. 558,332
9 Claims. (Cl. 192—48.3)

ABSTRACT OF THE DISCLOSURE

Disclosed for a stripfilm projector is a framing mechanism for precisely registering a frame of a stripfilm for projection. An indexing mechanism intermittently advances the stripfilm the height of a frame. The framing mechanism cooperates by a friction clutch with a shaft assembly associated with the indexing mechanism, which clutch normally remains in frictional engagement with a clutch housing, but is releasable therefrom by manual control means to engage and adjust the shaft assembly less than the height of a frame for registration of a film frame for projection upon each subsequent indexing operation of the indexing mechanism.

---

The present invention relates to photographic transparency projectors of the type in which each film frame of a film strip is adapted for still viewing as opposed to a motion picture projector in which the frames are adapted for rapid successive change. Particularly, the invention relates to a combination stripfilm advancing and framing mechanism for a stripfilm projector.

A stripfilm projector of the class with which the instant invention concerns itself, ordinarily comprises automatic and manual means for intermittent filmstrip indexing, i.e., advancing or feeding a set distance each of successive connected-together transparency frames which form a filmstrip, with the intention of frame alignment or registration with a film projection opening. Additionally, each projector conventionally also comprises manual framing means for adjusting a film strip to bring a single frame into precise projection alignment so that upon indexing of successive frames, each will be brought into proper alignment for projection as a matter of course.

It is the principal object of the present invention to provide a new and novel framing means for a stripfilm projector.

It is additionally an object of the invention to provide a new and novel combination stripfilm indexing and framing mechanism for a stripfilm projector.

It is further an object of the invention that a manually operated friction clutch be provided for framing in a stripfilm projector.

The foregoing and other objects, features and advantages of the present invention will become more apparent upon consideration of the following description and appended claims, when considered in conjunction with the accompanying drawings wherein the same reference character or numeral refers to like or corresponding parts throughout the several views.

On the drawings:

FIG. 1 is a longitudinal sectional view of a combination stripfilm indexing and framing mechanism in a stripfilm projector embodying the present invention.

FIG. 2 is a planar projection of the sectional views taken substantially along the broken line 2—2 of FIG. 1 and looking in the direction of the arrows.

FIG. 3 is a planar projection of the sectional views taken substantially along the broken lines 3—3 of FIG. 1 and looking in the direction of the arrows.

FIG. 4 is a longitudinal sectional view taken substantially on the line 4—4 of FIG. 1 and looking in the direction of the arrows.

FIG. 5 is a perspective view of a spring loaded band comprising the combination stripfilm indexing and framing mechanism.

FIG. 6 is a perspective view of a friction clutch member comprising said last named mechanism, parts being broken away from the purpose of illustration.

Referring now to FIG. 1, a pair of parallel partitions 11 and 13 of what may be a conventional stripfilm projector define therebetween a projector chamber 53. A conventional stripfilm feeding sprocket member 15 is supported in said chamber by said partitions. Sprocket member 15 is axially elongated and has a pair of integral sprocket flanges 17 and 19 on opposite ends thereof. Flanges 17 and 19 are spaced from each other in a manner such that their sprockets 21 are adapted to drivingly engage marginal perforations in a stripfilm (not shown) for indexing thereof in a manner which is known in the art.

Shaft 23 provides an axial rotational support for the sprocket member 15 which is secured corotationally with said shaft by suitable means which may include a set screw 25. In the illustrated embodiment, sprocket member 15 is also adapted for adjustment axially of the shaft within the limits of a slot 27 formed in the shaft and in which the set screw is adapted to engage for sprocket member securance.

Journalling hub 31 rotationally supports portion 29 of shaft 23 which extends outwardly from one end of sprocket member 15. Journalling hub 31 may be corotationally secured to shaft portion 29 by means such as a set screw 37; and said last hub extends through aperture 39 in partition 13. Aperture 39 is shown lined with an annular anti-friction bearing 41 in rotational association with which said journalling hub 31 is arranged.

Bearing hub 33, fixed with respect to partition 11, rotationally supports a portion 35 of shaft 23 which extends from an opposite end of sprocket member 15. Bearing hub 33 has reduced annular portion 43 which projects through aperture 45 in partition 11, aperture 45 being in co-axial alignment with aperture 39 in portion 13. Retention of the bearing hub may be facilitated by retaining ring 47 which seats, in a recess formed in shaft portion 35, against the proximate face of the bearing hub to hold the opposite face thereof against partition 11. Bearing hub 33 may be countersunk as at 63 to accommodate an anti-friction bearing sleeve 65 which is held by retaining ring 47 for journalling support of shaft portion 35.

Journalling hub 31 of the illustrated embodiment has an integral gear flange 147 which is disposed between partitions 11 and 13. The teeth of this gear flange are adapted for operable mesh with another gear of an auxiliary sprocket assembly (not shown). The latter includes a shaft (not shown) which is carried on a pair of spaced apart arms 49 rockable about journalling hub 31 and bearing hub 33. The auxiliary sprocket assembly does not concern the present invention and accordingly further description thereof is omitted.

A clutch housing, casing or shell-like member 51 is fixed to side partition 11 outside of projector chamber 53. Housing 51 has an annular wall 55 which projects away from partition 11 and defines clutch chamber 57. Housing 51 has also an aperture 59 which is co-axially aligned with clutch chamber 57, though of significantly smaller diameter, and which is also co-axially aligned with the apertures 39 and 45. Portion 61 of the shaft 23 which projects outwardly from chamber 53 and away from partition 11 extends concentrically through aperture 59 out of housing 51.

A stripfilm advancing, feeding or indexing knob 69, which is corotational with shaft 23, herein is shown affixed on outer end portion 67 of shaft part 61 by means of splining as at 71 whereby sprocket member 15 may be rotated. The indexing knob is manually controllable by any suitable means, as for example, handle 73 which is shown retained on the indexing knob by screw 75. Inward movement of the indexing knob axially of shaft 23 is precluded by retaining ring 77 which seats in a recess formed in shaft end portion 67 and holds washer 79 against a proximate face of the indexing knob. The indexing knob is spaced axially of shaft 23 from clutch housing 51.

A finger operated friction clutch member, which is generally designated 81 and is shown in perspective in FIG. 6, is mounted about shaft part 61 between indexing knob 69 and clutch housing 51. Clutch member 81 comprises a hub plate 83 having a central aperture 84 (FIG. 6) to accommodate passage of shaft portion 61 about which hub plate 83 is rotationally arranged. An integral annular clutch hub flange 85 (FIGS. 1 and 2) projects from the hub plate concentric with shaft 23 toward indexing knob 69. The face of hub flange 85 proximate the indexing knob together with a plate 87 (FIG. 1), which is retained in a groove in shaft portion 67 against retaining ring 77, form a race for anti-friction ball-bearing means 89 to facilitate rotation of indexing knob 69 relative to clutch member 81.

Bushing 91, which is axially adjustable on shaft portion 61, is corotationally secured thereto by means of a set screw 93 (FIG. 4) to form a part of a shaft assembly with shaft 23. As illustrated, set screw 93 is adapted for keying in a bushing adjustment limiting slot 95 formed in shaft portion 61. The bushing is mounted within clutch chamber 57 adjacent hub plate 83 in concentric relationship with annular flange 55 from which the outer surface of said bushing is spaced.

The bushing has a pair of diametrically arranged axial recesses in which a pair of compression springs 97 are mounted. The spring members serve to bias a pair of detent balls 99 (FIGS. 1 and 3) into a pair of grooves 101 which are fashioned in the bushing proximate face of hub plate 83. Grooves 101, which are V-shaped and extend radially, are each spaced from an adjoining groove by 90°. Balls 99 are adapted by the urging of springs 97 to engage in opposite pairs of said grooves after each 90° turn of shaft 23. Observation is made that in the illustrated device, each 90° turn of sprocket member 15 is adapted to cause a film strip (not shown) to move a film frame indexing distance. As will be more readily apparent from the description which follows, clutch member 81 is normally held from rotation under the torque load imposed on detent balls 99 upon indexing motivation of shaft 23.

Hub plate 83 has what may be considered an integral radial stem 103 (FIGS. 2 and 6). A pair of arcuate arms 105 project from stem 103 towards each other in concentric relationship with the circumference of hub plate 83 to form therebetween a pair of arcuate spaces 119. Such arrangement causes arms 105 to have spring-like characteristics. At a position short of that which is diametric to stem 103, each of arms 105 has an extension 107 which projects from its associated arm in a somewhat radial direction. The arrangement and proportioning of extensions or manually grippable portions 107 is such that they are disposed in opposition to each other and are adapted to be squeezed toward each other and, upon release to move apart under the spring action inherent in the construction.

Each of arms 105 has an integral arcuate flange 109 which extends from the plane of hub plate 83 into clutch housing 57 toward partition 11 between clutch housing flange 55 and bushing 91. The arrangement and proportioning of arcuate flanges 109 and arms 105 is such that shoulder 111 (FIG. 6) is generated between each arm and its associated flange.

An arcuate pressure shoe 113, the inner radius of curvature of which is the same as the external radius of curvature of flanges 109, is mounted about each flange 109 against a corresponding shoulder 111 for normal frictional clutch engagement with the inner surface of housing flange 55. Shoes 113 are fabricated of a suitable material possessing a high coefficient of friction and proportioned so that, when clutching is maintained in a manner hereinafter to become apparent, clutch member 81 will remain immobile relative to housing flange 55 during indexing movement of shaft 23.

An arcuate band 115 which is bent for spring loading is disposed along the continuous curved plane formed by the inner arcuate surfaces of flanges 109 about and normally spaced from bushing 91. Opposite ends 121 of band 115 have a pair of bosses 117 which engage indexing knob proximate face of arms 105 to facilitate proper assembly when band 115 is inserted in operative position. To insure that band 115 is arranged in proper straddling position with respect to flanges 109, they are fashioned with recesses 123 conforming to the contour and adapted for reception of band 115. The normal radius of curvature of band 115 is such that upon assembly its spring load is of sufficient magnitude to cause shoes 113 to frictionally engage flange 55 with a force adequate to preclude movement of clutch member 81 under indexing torque.

Clutch mechanism 81 is in essence a framing knob. This framing knob is rotatable by releasing shoes 113 from gripping engagement with clutch housing flange 55. That, of course, is achieved by squeezing handles 107 together. The parts are proportioned so that upon squeezing of handles 107 to release shoes 113, band 115 is brought into frictional and gripping engagement with bushing 91. As a result of such engagement, as the framing knob is then rotated, the bushing will be caused to rotate and accordingly carry with it shaft 23 and the entire indexing mechanism for framing adjustment.

As many substitutions or changes could be made in the above described construction and as many apparently widely different embodiments of the invention within the scope of the claims could be constructed without departing from the scope and spirit thereof, it is intended that all matter contained in the accompanying specification shall be interpreted as being illustrative and not in a limiting sense.

What is claimed is:

1. A film handling mechanism for indexing and framing transparency frames of a filmstrip in a strip-film projector,
   indexing means for advancing a filmstrip a distance equal to the height of a frame,
   framing means for adjusting the filmstrip less distance than the height of a frame to align a frame for projection, and
   a manually controllable shaft assembly arranged for rotational response to indexing torque by said indexing means and said framing means, the framing means comprising:
      friction clutch means in a clutch housing arranged for selective engagement with said housing and with said shaft assembly and for selective adjustment relative each, said clutch means being normally fixed relative to said housing in yieldable engagement therewith, and being movable into friction engagement with said shaft assembly for fixed relation therewith and simultaneous movable relation with said housing; and
      selectively yieldable and rotatable manual control means for selectively shifting said friction clutch means to engage said shaft assembly wherein said shaft assembly is rotatable relative said housing under rotational torque by said manual control means to position a frame of the filmstrip for projection.

2. A mechanism as defined in claim 1 in which the friction clutch means comprises a spring biased assembly arranged about said shaft and normally restrained from movement during operation of said indexing means, and said manual control means being manually grippable means for overcoming the spring bias to permit rotation of said friction clutch means with said indexing means for framing.

3. A mechanism as defined in claim 2 in which the spring biased assembly comprises flexible means movable toward and away from said shaft to reversibly condition said clutch means for and against corotation with said shaft, the grippable means comprising manual extensions projecting from said flexible means for conditioning said clutch assembly against the spring biasing of said assembly.

4. A mechanism as defined in claim 3 in which the flexible means comprises a pair of spring arms each arranged for partial encirclement of said shaft, friction means disposed about said arms and normally biased into releaseable frictional engagement for selective securance of said clutch means against rotation under the torque of said shaft during indexing.

5. A mechanism as defined in claim 3 in which the flexible means has inner and outer surfaces, said friction clutch means also including a friction shoe disposed against the outer surface of said flexible means, and a spring loaded friction band disposed against the inner surface of said flexible means and normally urging said friction shoe into frictional engagement to hold said clutch means from movement under indexing torque.

6. A mechanism as defined in claim 1 in which the control means comprises:
a grooved plate arranged about said shaft and corotational with said clutch member; and
spring biasing means for holding said clutch member in yieldable engagement with said clutch housing and said shaft assembly comprises:
detent means corotationally arranged with said shaft in yieldable locking engagement with said grooved plate.

7. A web handling mechanism for indexing and framing transparency frames of a filmstrip and the line in a stripfilm projector, the mechanism comprising:
indexing means for intermittently advancing a filmstrip a distance equal to the height of a frame;
a manually controllable shaft arranged for rotational response to indexing torque;
a clutch housing fixed about said shaft;
framing means for adjusting a filmstrip to align a frame in projection position; and manually controllable friction clutch means normally fixed relative to said shaft and arranged for selective rotation thereabout and connection for corotation therewith; said clutch means including:
detent means for yieldably holding said indexing means fixed relative to said clutch means and conditioned to permit relative rotation thereof under indexing torque;
a clutch member arranged in releasable gripping association with said clutch housing and for selective corotation with said shaft;
a pair of arcuate bendable arms integral with said clutch member and having portions disposed within said housing;
a spring loaded band biasing said arms for frictional retention by said housing against indexing torque on said shaft; and
manually grippable means disposed for manual access relative said housing, and being arranged for bending said arms against said spring loaded band wherein said clutch member is moved from association with said clutch housing for selective framing corotation with said shaft.

8. A mechanism as defined in claim 7 in which the detent means comprises:
a recessed bushing arranged for corotation with said shaft;
spring biased ball detent means having a portion disposed in the bushing; and
the clutch member having a grooved plate disposed adjacent said bushing for releasable reception in its grooves of another portion of the ball detent means.

9. A mechanism as defined in claim 8 in which the spring loaded band is arcuate and bendable and held under tension by said arms, the bushing being disposed adjacent said arms and proportioned for frictional engagement with said band when said arms are bent to release the clutch member from said clutch housing whereby framing corotation of said clutch member and said shaft is facilitated.

References Cited

UNITED STATES PATENTS

| | | | |
|---|---|---|---|
| 780,156 | 1/1905 | Burr | 192—80 |
| 1,007,210 | 10/1911 | Pinder | 192—80 |
| 2,372,693 | 4/1945 | Swift | 192—128 |
| 2,534,732 | 12/1950 | Perillo | 352—163 X |
| 3,003,393 | 10/1961 | Kilday | 352—163 X |

BENJAMIN W. WYCHE III, *Primary Examiner.*

L. J. PAYNE, *Assistant Examiner.*

U.S. Cl. X.R.

192—56, 80, 100; 88—28; 352—163